Aug. 7, 1923.
J. P. RYAN
1,463,845
BALL COLLECTING DEVICE
Filed Aug. 29, 1921 5 Sheets-Sheet 1
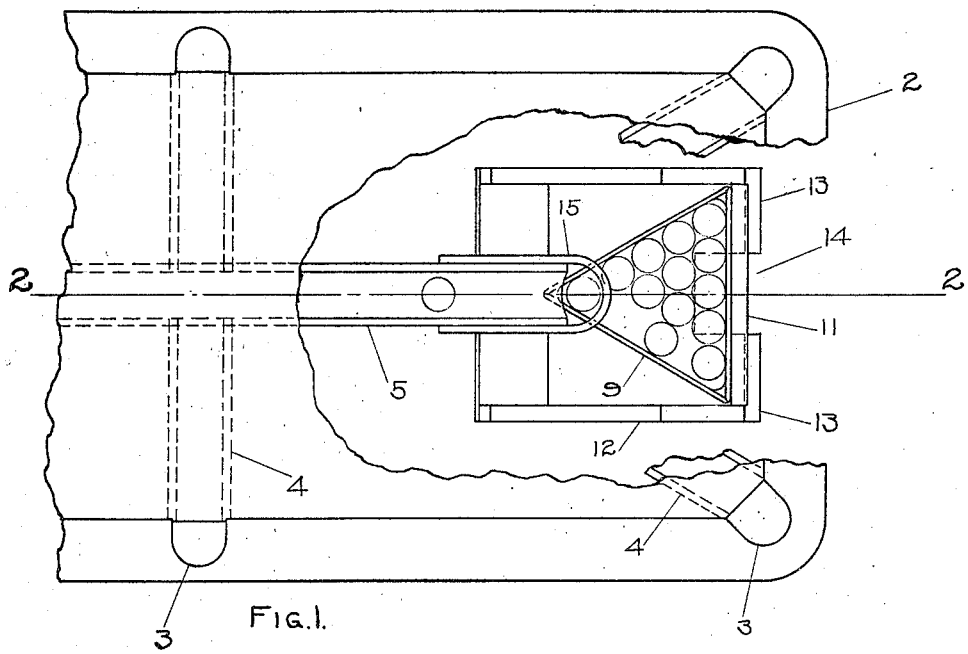
Fig.1.
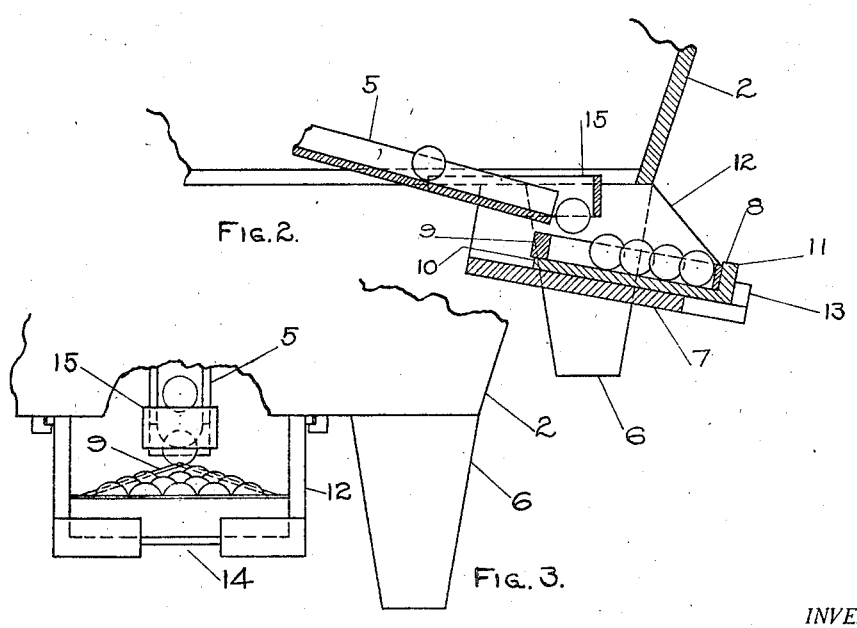
Fig.2.
Fig.3.
INVENTOR.
J. P. Ryan,
BY
ATTORNEY.

Aug. 7, 1923.

J. P. RYAN 1,463,845

BALL COLLECTING DEVICE

Filed Aug. 29, 1921

INVENTOR.
J. P. Ryan
BY
ATTORNEY.

Aug. 7, 1923.

J. P. RYAN 1,463,845

BALL COLLECTING DEVICE

Filed Aug. 29, 1921

INVENTOR.
J. P. Ryan
BY
ATTORNEY.

Aug. 7, 1923.

J. P. RYAN 1,463,845

BALL COLLECTING DEVICE

Filed Aug. 29, 1921

INVENTOR.
J. P. Ryan
BY
ATTORNEY.

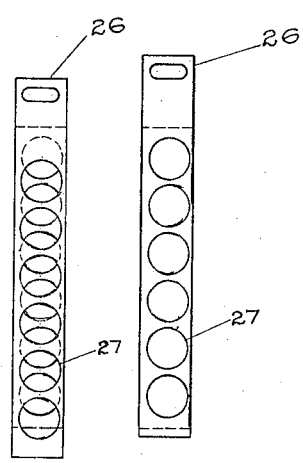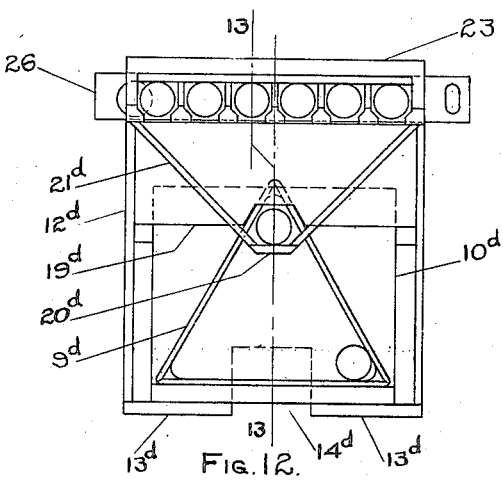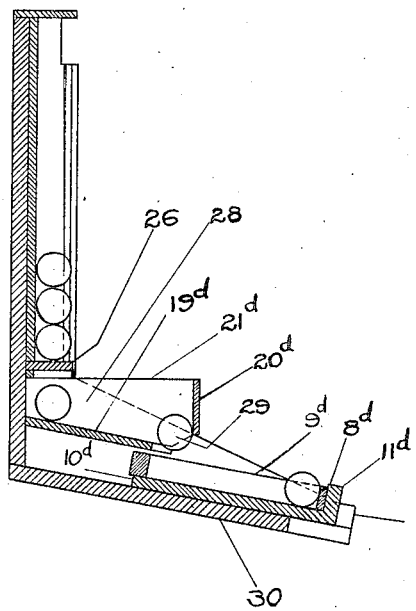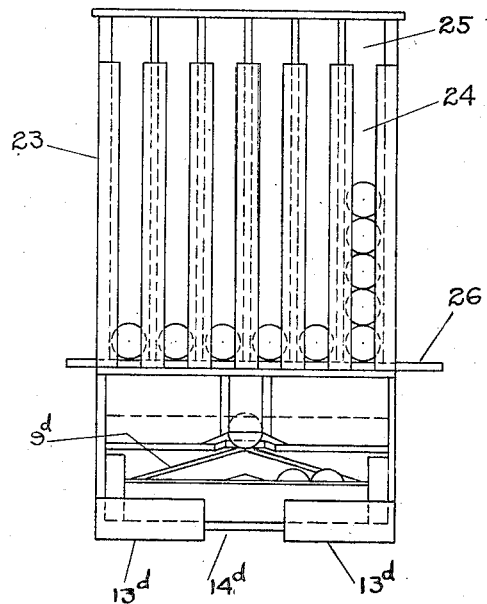

Patented Aug. 7, 1923.

1,463,845

UNITED STATES PATENT OFFICE.

JOSEPH P. RYAN, OF HARTFORD, CONNECTICUT.

BALL-COLLECTING DEVICE.

Application filed August 29, 1921. Serial No. 496,319.

*To all whom it may concern:*

Be it known that I, JOSEPH P. RYAN, a citizen of the United States, residing at Hartford, in the county of Hartford and State of Connecticut, have invented certain new and useful Improvements in Ball-Collecting Devices, of which the following is a specification.

This invention relates to ball-collecting devices. A ball-collecting device involving the invention can be employed with utility in many different connections. Two of the many illustrations are in association with a pool-table or a ball-rack such as is ordinarily employed in conjunction with such a table. I have a number of objects in view among them being the provision of means of a simple nature which can be readily and easily handled and by which the balls can be maintained in a group and can be so placed upon a table.

In the drawings accompanying and forming part of the present specification I have shown in detail several of the many forms of embodiment of the invention, which to enable those skilled in the art to practice the same will be set forth fully in the following description. Obviously I am not restricted to this disclosure. I may depart therefrom in a number of respects within the scope of the invention defined by the claims following said description.

Referring to said drawings:

Figure 1 is a top plan view of a portion of a pool-table partly broken out and equipped with a ball-collecting device involving my invention.

Fig. 2 is a longitudinal section on the line 2—2 of Fig. 1.

Fig. 3 is an end elevation as seen from the right in Figs. 1 and 2 with a portion of the table broken away.

Fig. 10 is a bottom plan view of a discharge controlling device for the balls from a rack.

Fig. 11 is a like view showing holes in register.

Fig. 12 is a top plan view of a rack with the top removed.

Fig. 13 is a vertical section on the line 13—13 of Fig. 12.

Fig. 14 is a front elevation of the structure shown in Figs. 12 and 13.

Figure 4:
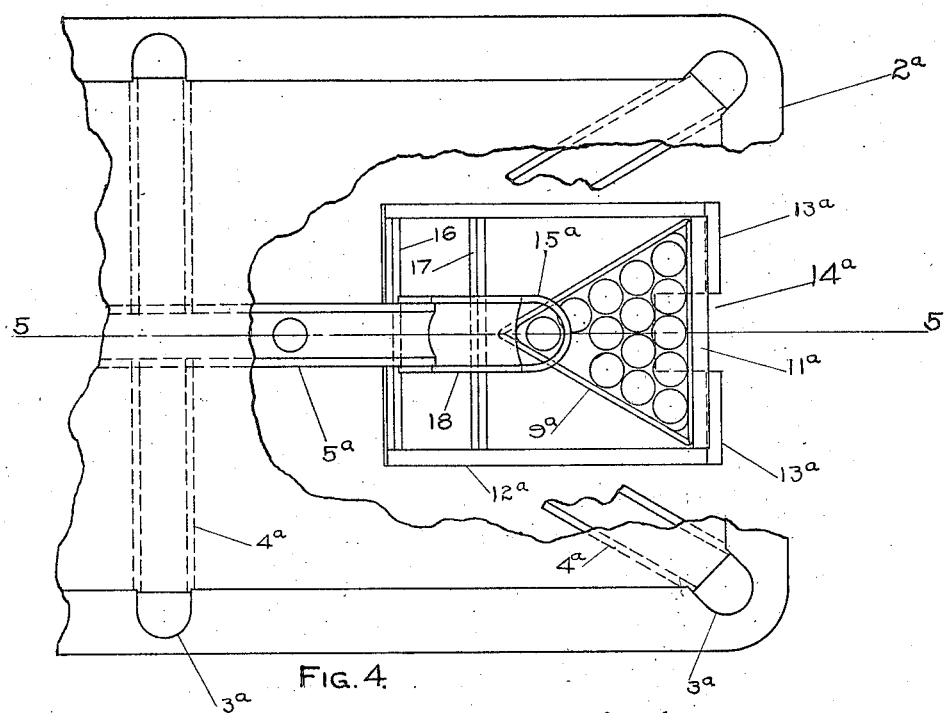
Fig. 4 is a view similar to Fig. 1 of a slightly modified form.

Referring first to Figs. 1, 2, and 3 I have shown a pool-table 2 which except as hereinafter noted, is of the usual character, having at its corners and sides pockets as 3. As shown there lead from these pockets the chutes or runways 4, the discharge ends of which open into the main chute or runway 5. The auxiliary chutes 4 and the main chute 5 are as shown inclined downwardly and forwardly so that a ball after passing from one of the pockets 3, is discharged into an auxiliary chute as 4 and is conducted therealong by gravity and is discharged into the main chute 5 for disposition as will hereinafter be set forth. Ordinarily these several chutes are fixedly mounted below the top frame of the table.

The table as shown slidably sustains at the head end, below the top and between the front legs 6 a support as 7 which is practically in the form of a rectangular bracket, box, or shelf, the body of which is situated below the delivery end of the main chute 5. This support or bracket removably sustains a ball-receiver, such as that denoted in a general way by 8 and which as represented comprises a triangular frame 9 and a bottom 10 the bottom when the receiver is in operative position as shown for instance in Figs. 1, 2, and 3 completely sustaining the frame or triangle 9 which is practically of the same shape as the setting up frame found on the ordinary pool-tables. The forward or lower end of the bottom or base 10 has an upstanding lip or flange 11 extending as shown entirely across it to be abutted by the base leg or branch of the frame or triangle 9. The support 7 as shown, has the parallel side strips 12 which are abutted on their inner sides by the side edges of the bottom or base 10 when the ball-receiver 8 is in operative relation. At this time the flange 11 of said base or bottom engages against the inwardly extending lips 13 at the forward ends of the side flanges 12.

The space or slot 14 between these lips 13 is intended to receive the hand in order to grasp the ball-receiver 8 and remove it with the contained balls bodily from the support or bracket 7 and place it upon a table.

The ball-receiver 8 desirably involves in its structure a triangular frame and I prefer to collect the balls in this triangular rack by dropping the balls one at a time into the apex portion thereof after which it can move by gravity to its proper position and the means shown for bringing about this advantageous result will now be set forth.

Fastened to the delivery end portion of the delivery or main chute 5 is a ball controller which as shown is in the form of a yoke the sides of which are fastened to the outer sides of the primary chute 5 in some proper manner and the head or transverse portion of which is located a distance forward of the delivery end or outlet of the inclined chute 5 a trifle greater than the diameter of the balls. The controller or yoke 15 is however, horizontally disposed.

Figure 8:
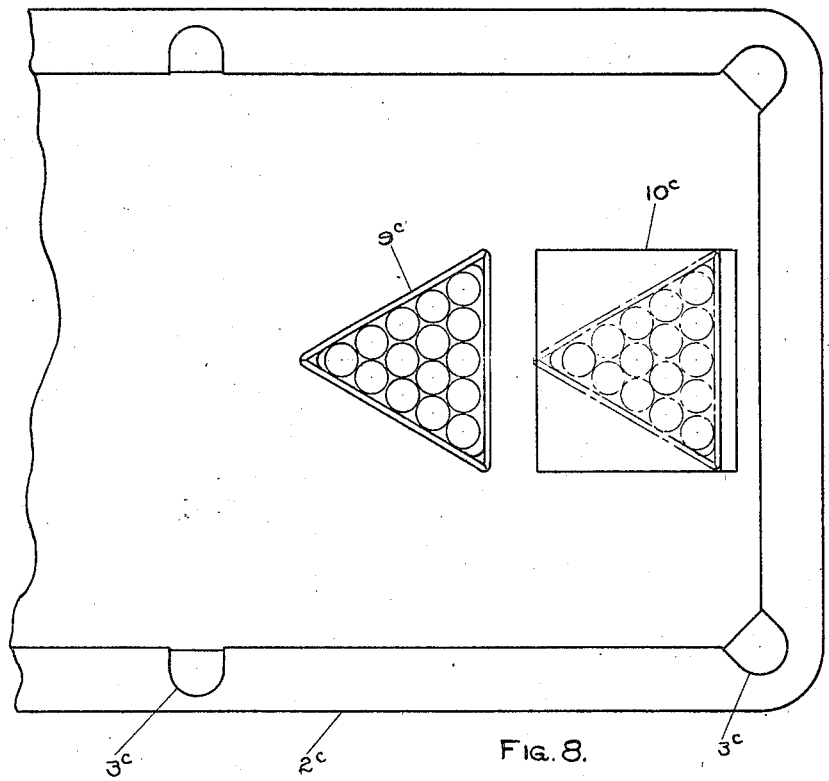
Fig. 8 is a top plan view showing the manner of placing the balls on the table.

The receiver 8 as I have broadly considered it, is located under the discharge end of the main chute 5 when the parts of the controller are in operative relation, and at this particular time I prefer that the apex portion of the frame or triangle 9 be directly under the space or interval between the front edge of the chute 5 and the transverse portion of the controller or yoke 15. When therefore a ball enters the main chute in the manner described hereinbefore, it travels along said main chute and falls from its front end and strikes the transverse portion of the controller or yoke 15 and is directed or guided thereby downwardly and straight into the apex of the two parts in the construction shown, constituting a ball receiver or collector. After the ball is on the bottom or base 10 it travels by gravity to its proper place in the triangle and the procedure is repeated with all of the balls they being confined in triangular relation by the triangle. At this point the bottom or base 10 with the frame or triangle 9, triangular body of balls resting on said bottom is lifted from the support or bracket 7 and is placed on the table with the bottom or base 10 resting on the cloth of the table as in Fig. 8. At this time the base is slipped from under the triangle 9 with the confined balls leaving the latter on the cloth of the table in triangular condition. At this point the balls are racked on the table and the frame lifted from the balls.

Figure 5:
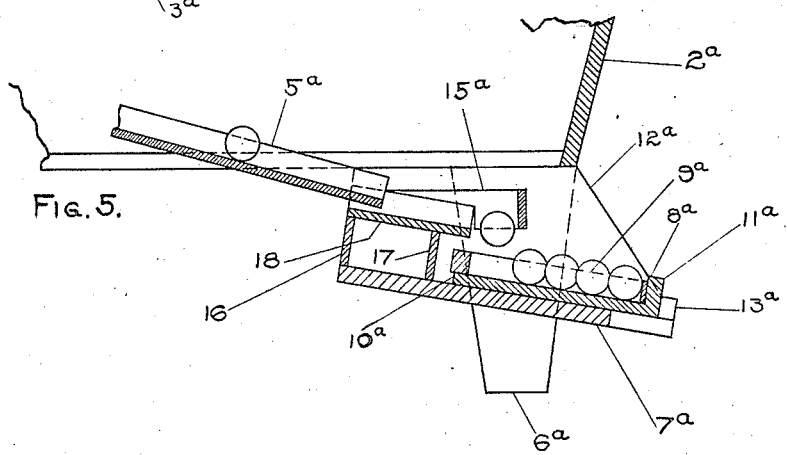
Fig. 5 is a longitudinal section on the line 5—5 of Fig. 4.

In Figs. 4 and 5 I have shown one of many modifications. As a matter of fact practically the only difference in this structure from that already described is the government of the balls from the time they leave the main chute $5^a$ until they enter the ball receiver or collector $8^a$. From the observations made it will be apparent that the parts in Figs. 4 and 5 which are the same as those already described will be given identical characters with the exponent "a."

The support or shelf $7^a$ sustains the ball receiver or collector $8^a$. Extending between the sides of the support or shelf $7^a$ near the upper end thereof and rigid therewith are the parallel strips 16 and 17 which are spaced a short distance apart and the upper edges of which rigidly support the chute or directing member 18 slightly inclined or at a less inclination than the main chute $5^a$. The rear end of this chute member 18 is under the said main chute $5^a$ so that a ball after leaving said main chute $5^a$ will follow onto the chute member 18 and be caused to travel downwardly until it encounters the transverse portion of the horizontally disposed controlling member or yoke $15^a$ the transverse portion of which is spaced from the front end of the chute member 18, a distance slightly greater than the diameter of the ball. The ball then drops into the frame or triangle $9^a$ onto the base or bottom $10^a$ and when the mass of balls is collected in triangular order as before, they are placed upon the table in the manner hereinbefore described.

Figure 6:
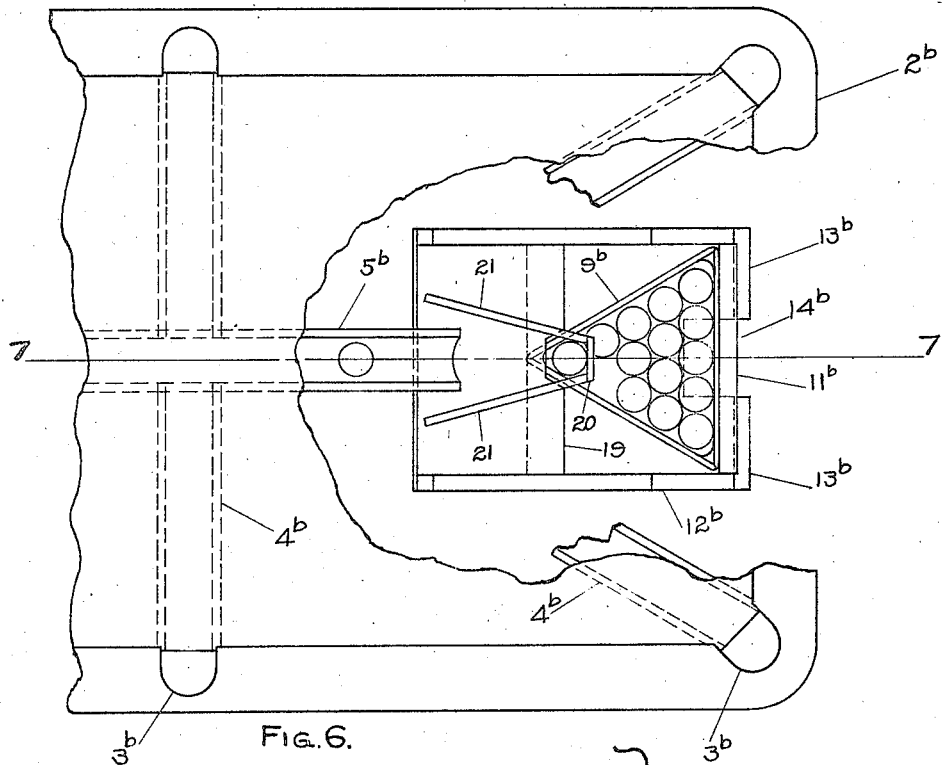
Fig. 6 is a top plan view of a further modification.
Figure 7:
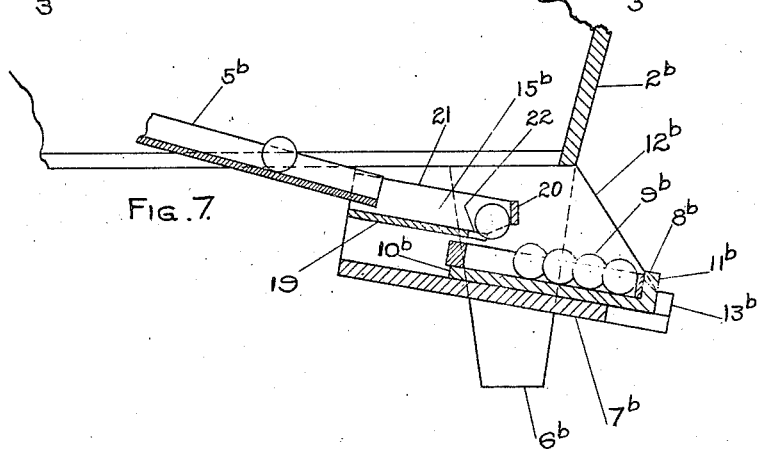
Fig. 7 is a longitudinal section on the line 7—7 of Fig. 6.

In Figs. 6 and 7 I show another modification and the only difference between this structure and that which has already been described, is in the controlling of the balls as they leave the main chute or runway $5^b$ and before they enter the ball collector or receiver $8^b$. In view of this circumstance the parts in Figs. 6 and 7 which are the same as those in the preceding views will bear like characters with the exponent "b."

The chute $5^b$ discharges the balls onto a collecting member $15^b$ which is of practically V-form and furnished with the bottom 19 and a front 20. The sides of the controller have wings 21 which are rigid with the sides of the support $7^b$. The controller $15^b$ has at its front end an opening 22 through which the balls can pass into the triangle $9^b$ to be disposed of as hereinbefore set forth. The bottom 19 of the controller is at a slight inclination so as to insure the direction of the balls to and through the slot 22 through which they fall into the rack or triangle $9^b$ onto the base $10^b$ and are disposed of as hereinbefore set forth.

Figure 9:
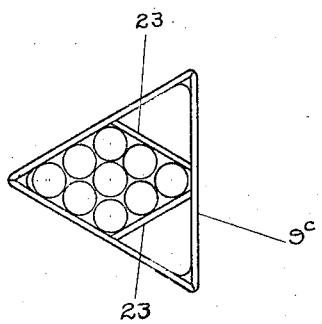
Fig. 9 is a top plan view of a modified form of a frame.

In Fig. 9 I show a slight modification of the bunching triangle and denote the same by $9^c$. Between two of the branches of this triangle extend strips as 23 which converge so as to form with two other branches of the triangle a virtually diamond shaped figure to receive a less number than 15 balls; in other words the balls are collected into a diamond shape.

In Figs. 10 to 14 I show a wall rack 23 having in it several parallel channels or ways 24 into which the balls may be dropped by the players, through the upper enlarged portions 25 of the channels. The discharge of the balls from the channels at the proper time is controlled by the slide 26 the solid portion of which normally closes the lower ends of the channels. By moving the slide however, in the proper direction the openings 27 of the slide may be brought to register with the discharge ends of the channels 24 so as to permit the passage of the balls from the channels, and their passage into the controlling member or hopper 28 having an inclined bottom and a discharge opening 29 at the forward end of the bottom so as to drop the balls one at a time through the apex portion of the triangle $9^d$ removably associated with the bottom or base $10^d$ and which normally rests on the shelf or bracket 30 from which the rack 23 rises. The shelf is desirably at an inclination so that the bottom or base $10^d$ will be at a similar disposition as will the triangle $9^d$ resting thereon, the apex of the triangle being immediately below the openings 29 so that the balls one at a time will positively be directed into the apex portion of the triangle.

In the several forms of the invention which I have shown and described, I provide a frame in connection with means for positively directing a ball into a definite pre-selected place in the frame. This frame in these several forms, is desirably so positively located as to be in a position in which the balls can be directed into the apex portion thereof which is usually but not essentially uppermost. The means which locate the frame desirably support it and are abutted by the bottom edge of the frame and the side-corners thereof this constituting a convenient manner of thus positively locating the frame so that the balls are not directed thereinto in indiscriminate order but are caused to enter it in an exact and definite relation. I have shown as I intimated several forms and have described the same somewhat extensively and in detail. There are, however, many other forms which answer my conditions, but which it is not necessary to represent.

What I claim is:

1. In a ball collecting device, the combination of a frame, a chute for directing a ball into the frame, and means for checking the movement of the ball at about the time it leaves the chute so that the ball is caused to be positively directed into a definite, pre-selected place in the frame.

2. In a ball collecting device, the combination of a triangular frame, a chute for directing a ball into the frame, and means for checking the movement of the ball at about the time it leaves the chute so that the ball is caused to be positively directed into the apex portion of the frame.

3. In a ball collecting device, the combination of a triangular frame, means for supporting the frame at an angle to the horizontal with the apex up, a chute for directing a ball into the frame, and means for checking the movement of the ball at about the time it leaves the chute and located over the apex portion of the frame so that the ball is directed into said apex portion.

4. In a ball collecting device, the combination of a frame, means for supporting the frame at an angle to the horizontal, a chute for directing a ball into the frame, and means for checking the movement of the ball at about the time it leaves the chute and for directing positively the ball into a corner of the frame.

5. In a ball collecting device, the combination of a frame, a chute for directing a ball into the frame, and means for arresting the movement of the ball before it enters the frame and for positively directing the ball into a definite pre-selected place in the frame.

6. In a ball collecting device, the combination of an open frame, a bottom on which the frame removably rests, means for removably supporting the bottom having an angle to the horizontal so that the frame will be similarly supported, a chute for directing a ball into the frame, and means for checking the movement of the ball at about the time it leaves the chute and for directing the ball positively into a definite pre-selected place in the frame.

7. In a device of the character described and in combination with a pool table, of an inclined platform having an upstanding lip, a flat board thereon having a flange adapted to engage against said lip, a triangular rack adapted to abut against said flange, and means for conducting the balls from the pockets of the pool table to the receiving point of said rack, said lip being cut away to permit the board to be readily grasped and removed from said platform.

In testimony whereof I affix my signature.

JOSEPH P. RYAN.

In presence of—
 SERENE E. TEMPLEMAN,
 HEATH SUTHERLAND.